United States Patent [19]
Brunel et al.

[11] Patent Number: 5,921,644
[45] Date of Patent: Jul. 13, 1999

[54] MOUNTING ARRANGEMENT FOR MOUNTING EITHER OF TWO DIFFERENTLY-SIZED SUBSYSTEM UNITS

[75] Inventors: Alain Brunel, St Genis le Ollieres; Christian Astier, Grenoble; Yves Bonfort, Herbeys, all of France

[73] Assignee: Hewlett-Packard Company, Palo Alto, Calif.

[21] Appl. No.: 08/933,237

[22] Filed: Sep. 18, 1997

Related U.S. Application Data

[30] Foreign Application Priority Data

Oct. 3, 1996 [EP] European Pat. Off. .............. 96410103

[51] Int. Cl.⁶ .................................................... A47B 81/00
[52] U.S. Cl. ........................................ 312/223.2; 361/685
[58] Field of Search .............................. 312/223.2, 223.1, 312/257.1; 361/725, 724, 685, 683, 829

[56] References Cited

U.S. PATENT DOCUMENTS

| | | | |
|---|---|---|---|
| 5,175,670 | 12/1992 | Wang | 361/724 X |
| 5,224,024 | 6/1993 | Tu et al. | 361/685 X |
| 5,260,851 | 11/1993 | Chiou | 361/685 |
| 5,269,598 | 12/1993 | Liu | 312/223.2 |
| 5,306,079 | 4/1994 | Liu | 312/223.2 |
| 5,438,476 | 8/1995 | Steffes | 361/724 X |
| 5,447,367 | 9/1995 | Wei | 312/223.2 |
| 5,488,538 | 1/1996 | Wakita | 361/685 |
| 5,510,955 | 4/1996 | Taesang | 361/685 |
| 5,564,804 | 10/1996 | Gonzalez et al. | 312/223.2 |
| 5,682,291 | 10/1997 | Jeffries et al. | 312/223.2 X |

OTHER PUBLICATIONS

Patent Abstract of Japanese Publication # JP63046682, Feb. 27, 1988.

*Primary Examiner*—Jose V. Chen
*Assistant Examiner*—James O. Hansen

[57] ABSTRACT

Hard disc drives for desktop computers are standardly available in two different sizes. A mounting tray is provided enabling the mounting of either size of unit in the same space without the need for different mounting pieces. The mounting tray includes two stepped side members provided with studs for engaging side fixing holes in the drive units. The positioning of the studs is such that the volumes occupied by the mounted units overlap to a large extent. The side members are joined by a flexible member that allows the side members to be flexed out of a normal oppositely-facing configuration for engagement about either of the drive units.

11 Claims, 7 Drawing Sheets

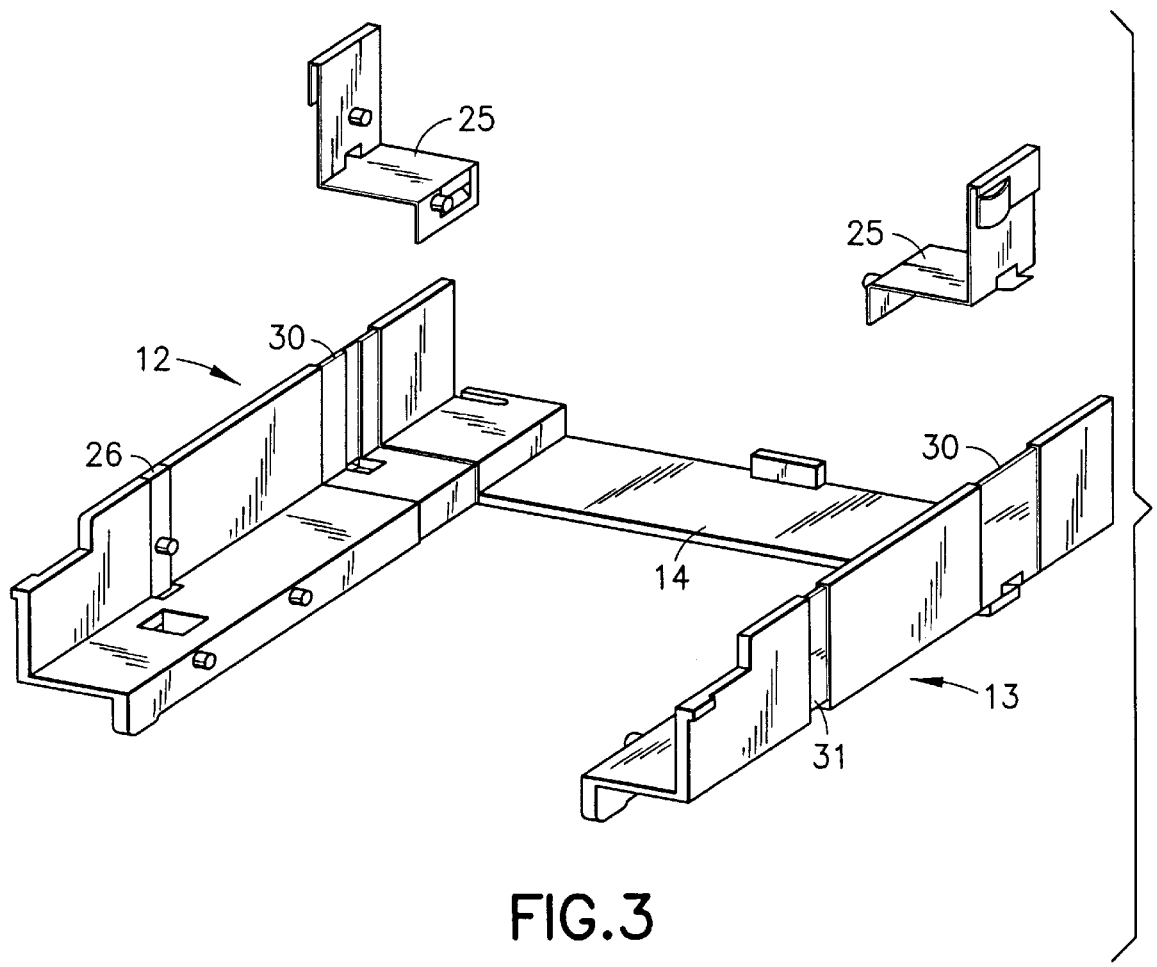
FIG. 3
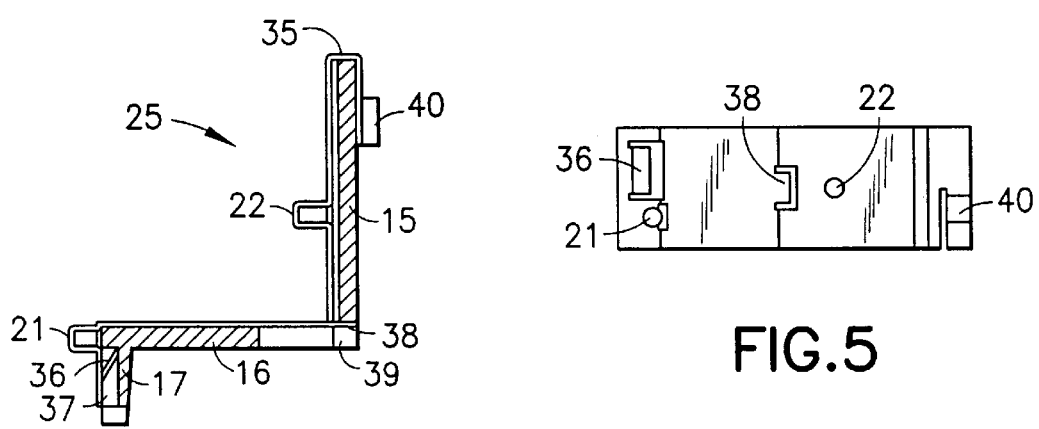
FIG. 4
FIG. 5

MOUNTING ARRANGEMENT FOR MOUNTING EITHER OF TWO DIFFERENTLY-SIZED SUBSYSTEM UNITS

FIELD OF THE INVENTION

The present invention relates to a mounting arrangement for mounting either of two differently-sized subsystem units (for example, mass-storage drive units) in a piece of equipment such as a desktop computer.

BACKGROUND OF THE INVENTION

For desktop computers, there are currently two standard sizes (width) for mass-storage drive units such as hard disc drives, floppy disc drives, CD-ROM drives, and tape drives; these two sizes of units are referred to as 5.25 inch (5"25) units and 3.5 inch (3"5) units. Standardising the size of such units, means that the mounting arrangements for the units need only be designed to receive particular sizes of unit which facilitates the design of the mechanical structure of a desktop computer. Thus, for example, a desktop computer may be designed with four drive bays, three of which are for 5"25 units and one for a 3"5 drive; whilst these drive bays can be populated with any desired units, a typical population would be a hard disc drive, CD-ROM drive and DAT tape drive for the 5"25 drive bays and a floppy disc drive for the 3"5 drive bay.

Traditionally, the mounting structure provided in a desktop computer for mounting drive units units has taken the form of a cage-like metal frame to which the units have been secured by fixing screws. To improve manufacturability, various other mounting structures have been used such as the structure described in U.S. Pat. No. 5,306,079 that provides a number of different drive bays.

To provide both the manufacturer and user with the flexibility to add optional units as needed, it is standard practice to provide several drive bays in a computer. The manufacturer populates the drive bays according to the version of the computer to be produced whilst a user can add additional units as desired. Because of the two different standard sizes of drive units, it is common to provide drive bays adapted for both sizes of units. Nevertheless, it frequently occurs that a desired drive unit cannot be added because although there is an unoccupied drive bay, it is of the wrong size. To ease this problem it is known to provide mounting adaption pieces that can adapt a 5"25 size drive bay to receive a 3"5 drive unit (because the reverse adaption is not possible, it is desirable to provide more 5"25 drive bays than 3"5 drive bays). The use of such adaption pieces is not, however, an ideal solution because they may need to be separately ordered by a user wanting to install a drive unit and are usually difficult to mount.

It is an object of the present invention to overcome the foregoing problem.

SUMMARY OF THE INVENTION

According to the present invention, there is provided a mounting arrangement for mounting either of two differently-sized subsystem units in a common volume, said mounting arrangement comprising:

two mounting members for engaging respective opposite sides of a selected one of the two differently sized subsystem units, each mounting member having first engagement means for engaging a larger one of these units and second engagement means for engaging a smaller one of the units, at least one mounting member being formed with a step located between its first and second engagement means such as to space the first engagement means of the two mounting members by a distance greater than their second engagement means, and the first and second engagement means respectively mounting the larger and smaller units in a substantial common volume; and a support structure for supporting the mounting members.

With this arrangement, the same mounting members can be used to mount two different sizes of subsystem unit in the same general volume. The volumes occupied by the two differently-sized units will generally overlap rather than one being contained wholly within the other.

Preferably, both said mounting members are stepped although in certain cases it would be possible to step only one side member. Furthermore the mounting members are preferably interconnected by a flexible cross member permitting the mounting members to be flexed out of a normal oppositely-facing configuration for engagement about either of the differently-sized subsystem units.

Advantageously, the engagement means take the form of studs arranged to engage in fixing holes provided in the sides of the subsystem units, thereby avoiding the need to use tools to engage the mounting members about a unit.

In a preferred embodiment each said mounting member comprises a wall element and at least one mounting element in the form of a generally U-shaped resilient metal member having two interconnected side arms embracing the wall element. One arm of the mounting element is stepped and is provided with two projections serving as the aforesaid studs respectively of the first and second engagement means. The other arm is provided with an outwardly-projecting resilient contact providing an electrical grounding connection to the support structure.

As regards the support structure, this is preferably provided with guide means for guiding the sliding insertion and withdrawal of the mounting members engaged about a subsystem unit. Advantageously, the guide means comprise support ledges for seating the steps of said mounting members. In addition, the mounting members are preferably provided on the underside of their steps with hook means that engage under edges of the support ledges when the mounting members are fully inserted in the support structure.

BRIEF DESCRIPTION OF THE DRAWINGS

A drive mounting arrangement embodying the invention will now be described, by way of non-limiting example, with reference to the accompanying diagrammatic drawings, in which:

FIG. 3 is a view similar to FIG. 1 but showing two metal mounting elements removed from the mounting tray;

FIG. 4 is a cross-sectional view showing a FIG. 3 mounting element in position on the mounting tray;

FIG. 5 shows a stamped metal part used to produce the FIG. 3 mounting element;

BEST MODE OF CARRYING OUT THE INVENTION

Figure 1:
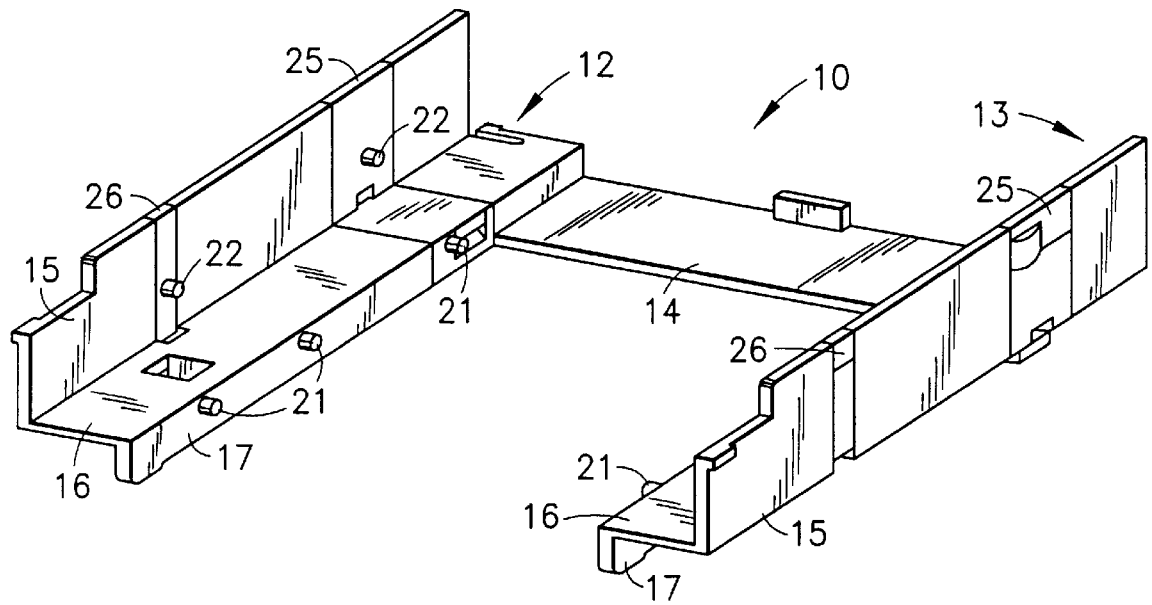
FIG. 1 is a perspective view from above of a mounting tray of the drive mounting arrangement.
Figure 2:
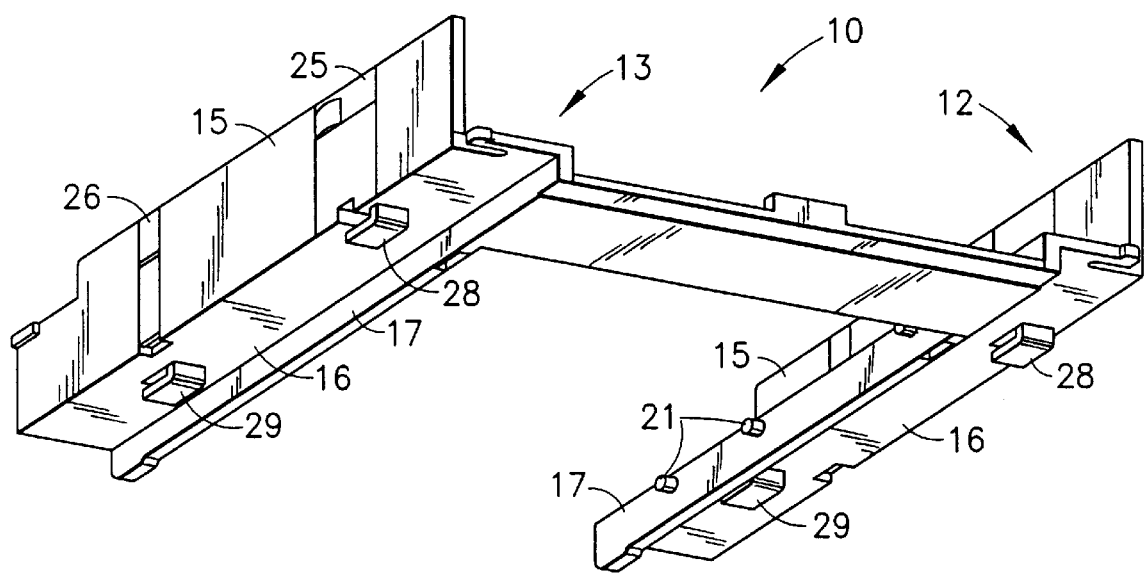
FIG. 2 is a perspective view from above of the FIG. 1 mounting tray.

FIGS. 1 and 2 show a drive mounting tray according to a preferred embodiment of the invention, this tray being adapted to mount either one of a 5"25 inch disc drive unit or a 3"5 disc drive unit such that there is a substantial overlap between the respective volumes occupied by the units when mounted in the tray 10.

The tray 10 comprises two side mounting members 12, 13 interconnected by a flexible cross member 14. Each side mounting member 12, 13 is of stepped cross-sectional form and comprises an upper wall element 15, a step element 16, and a lower wall element 17. The upper wall elements are spaced by the width of a standard 5"25 disc drive whilst the lower wall elements 17 are spaced by the width of a standard 3"5 disc drive unit. The elements 15, 16 and 17 and the cross member 14 are integrally moulded from a plastics material such as ABS, ABS-PC, or polycarbonate.

The upper wall elements 15 carry locating studs 22 positioned and dimensioned to engage in side fixing holes standardly provided in 5"25 disc drive units (these holes are normally threaded but the studs 22 are not and are simply intended to locate in the fixing holes). Similarly, the lower wall elements 17 are provided with locating studs 21 positioned and dimensioned to engage in side fixing holes standardly provided in 3"5 disc drive units. Because of the step form of the side mounting members 12 and 13, the distance between the locating studs 22 is greater that than between the locating studs 21.

On each side member 12, 13 the upper locating studs 22 are provided by respective metal mounting elements 25 and 26, the element 25 also providing one of the lower locating studs 21. The purpose of the mounting elements 25 and 26 is to provide a grounding path between a mounted drive unit and a support structure receiving the mounting tray 10. The form of the mounting element 25 can be seen from FIG. 3 in which both elements 25 are shown lifted off their respective side members 12, 13. Also in FIG. 3, one of the mounting elements 26 has been omitted to illustrate its seat on the side member 13.

FIG. 4 shows the form of the mounting element 25 in more detail, this Figure being a cross sectional view of the element in its mounted position on a side member 12, 13. As can be seen, each mounting element 25 has the same general step cross-section as the side mounting member 12, 13 and each element 25 is arranged to seat in a recessed zone of the corresponding side member such as to lie flush with the surface of that member (apart from the studs 21 and 22 provided on the mounting element 25). An upper U-shaped portion 35 of the mounting element 25 engages over the top of the wall element 15, the mounting element being held in place by a resilient detent 36 snap engaged in a recess 37 formed in the lower wall element 17. A tab 38 projecting from the rear of the step portion of the mounting element 25 engages in a recess 39 formed at the base of the upper wall element 15 and additionally serves to hold the element 25 in place.

Each mounting element 25 is provided with one stud 22 and one stud 21. The part of the U-shaped portion 35 facing in the opposite direction to the studs 21, 22 is provided with a spring contact arm 40 for engaging a support structure to provide a grounding connection thereto. Electrical contact with a mounted disc drive is ensured by the engagement of the corresponding studs 21, 22 in side fixing holes of the unit.

The mounting elements 25 are formed by bending a stamped metal part of the form show in FIG. 5.

The mounting elements 26 have the same general construction and form as the mounting elements 25 but are simpler, being provided with only one stud 22.

Figure 6:
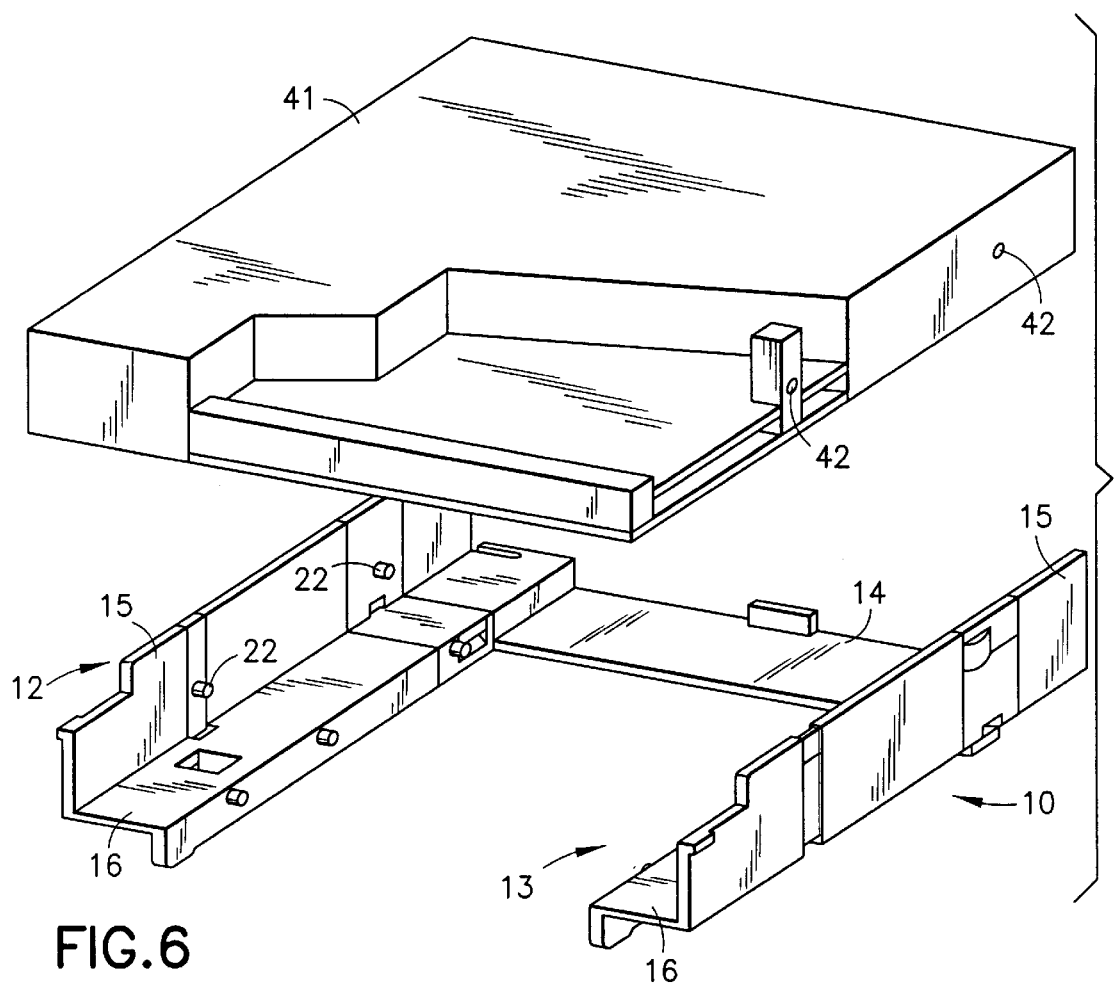
FIG. 6 is a perspective view showing a 5.25 inch hard disc drive ready for insertion in the mounting tray.
Figure 7:
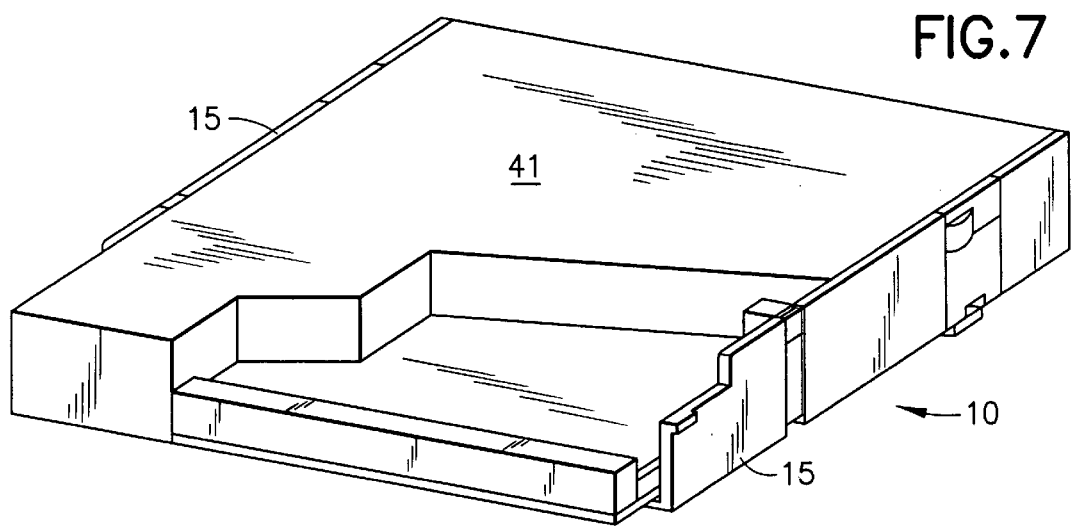
FIG. 7 is a view similar to FIG. 6 but showing the 5.25 inch disc drive inserted in the mounting tray.

FIG. 6 shows a 5"25 hard disc drive unit 41 just prior to insertion in the mounting tray 10. The drive unit 41 has side fixing holes 42 intended to be engaged by the upper locating studs 22 carried by the upper wall elements 15. FIG. 7 shows the drive unit 41 seated in the mounting tray 10. The drive unit 41 is held between the wall elements 15 of the two sides mounting members with the studs 22 engaged in the fixing holes 42 of the drive unit. For added support, the drive unit 41 is arranged to seat on the step elements 16 of the side members 12 and 13.

Figure 8:
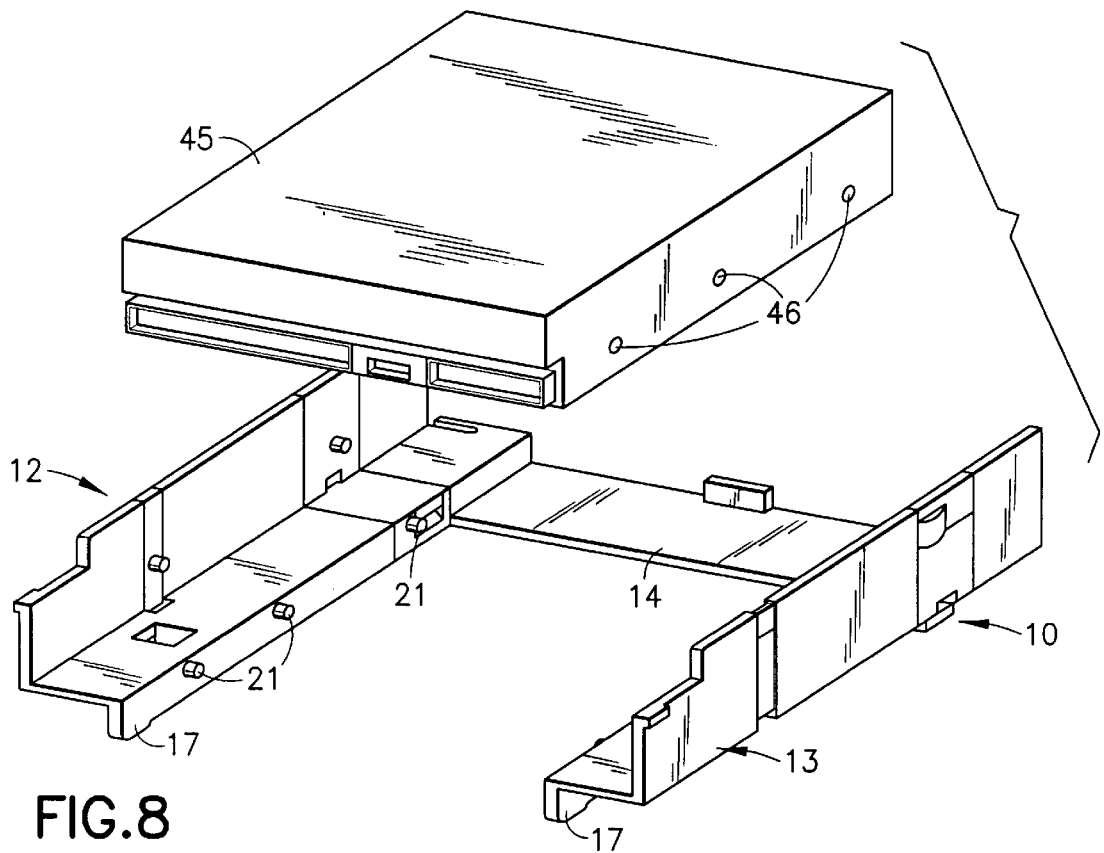
FIG. 8 is a perspective view showing a 3.5 inch hard disc drive ready for insertion in the mounting tray.
Figure 9:
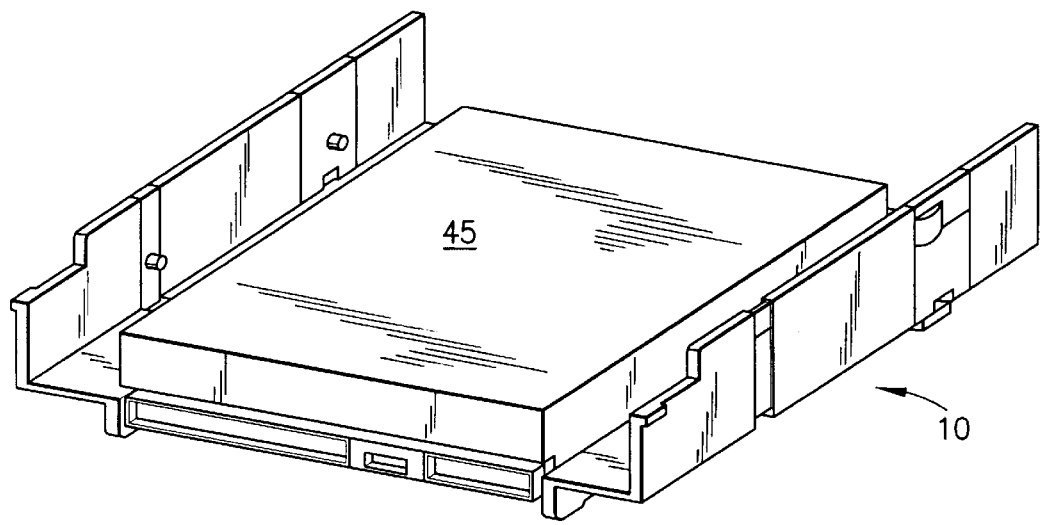
FIG. 9 is a view similar to FIG. 6 but showing the 3.5 inch disc drive inserted in the mounting tray.

FIG. 8 shows a 3"5 disc drive unit just prior to insertion in the mounting tray 10. The drive unit 45 is provided with side fixing holes 46 intended to be engaged by the locating studs 21 provided on the lower wall elements 17 of each side mounting member 12, 13. FIG. 9 shows the drive unit 45 when mounted in the tray 10. As can be seen, the bulk of the drive unit 45 lies above the level of the step elements 16 and thus occupies the same general space as occupied by the drive unit 41 in FIG. 7. To maximize the overlap of the volumes occupied by the units 41 and 45, the lower locating studs 21 are positioned as close as possible to the top of the lower wall elements 70.

Figure 10:
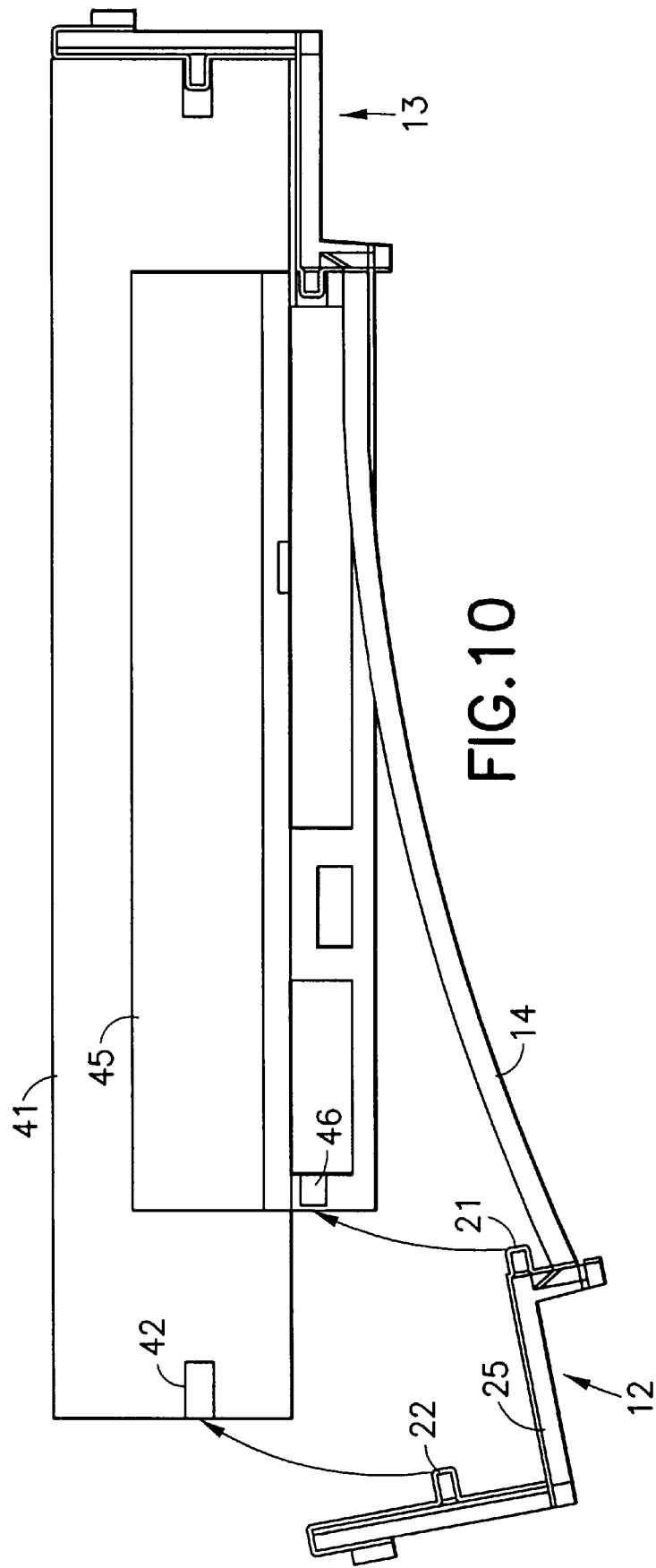
FIG. 10 is a diagram illustrating how insertion of a drive into the mounting tray is achieved by flexing of the mounting tray.

The actual insertion of the drive units 41, 15 into the mounting tray is effected by flexing the tray 10 to move the side mounting elements 12, 30 apart. The flexing is primarily due to the flexibility of the cross member 14 as is illustrated in FIG. 10. Typical cross-sectional dimensions of the cross member 14 are 2.5 mm by 35 mm. FIG. 10 shows the positioning of both drive units 41 and 45 in the mounting tray though, of course, only one such unit can be present at a time. Nevertheless, by showing both units present, the degree of overlap of the occupied volumes can be appreciated.

Figure 11:
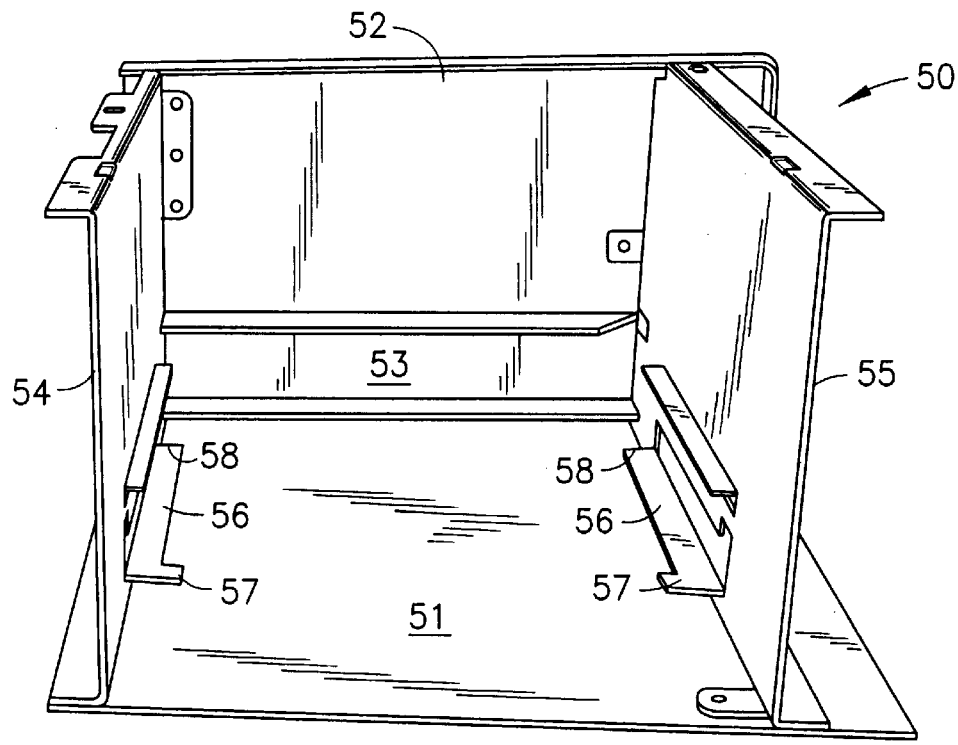
FIG. 11 is a rear perspective view of a support structure into which the mounting tray can be inserted.
Figure 12:
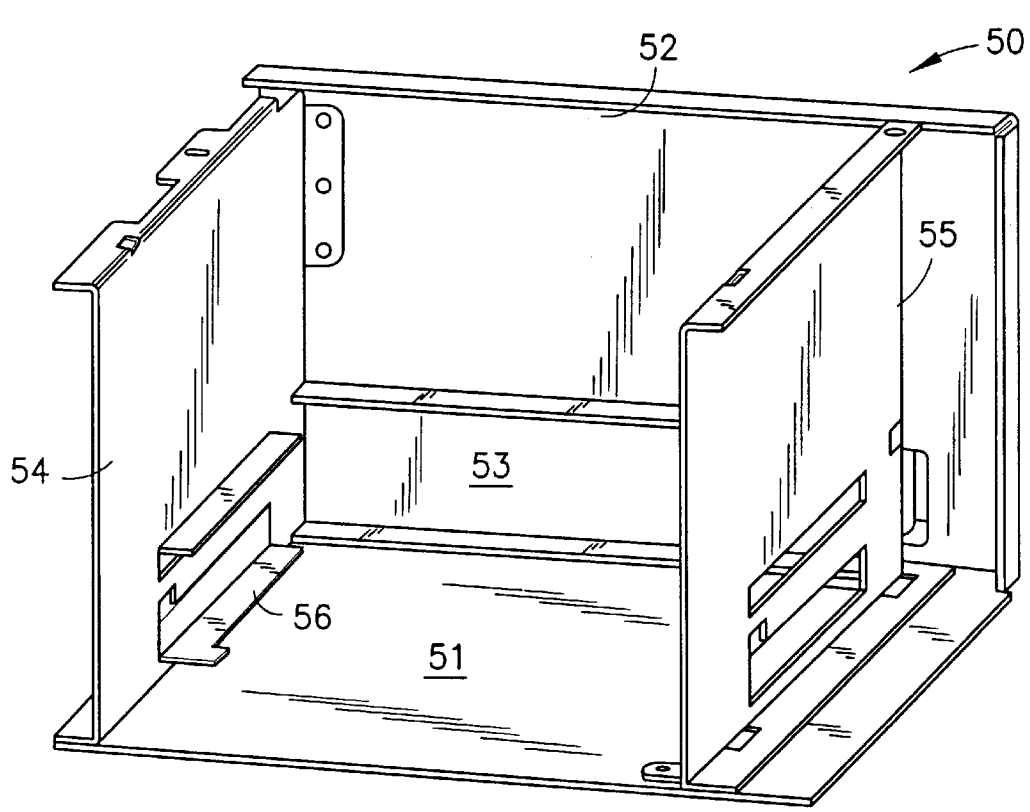
FIG. 12 is a perspective view similar to FIG. 11 but from a different angle.

The mounting tray 10, with or without a mounted drive unit 41/45, is insertable by sliding into a computer support structure 50 of the form shown in FIGS. 11 and 12. More particularly, support structure 50 comprises a base 51, an external wall 52 formed with a rectangular aperture 53, and two side walls 54 and 55. The base 51 and walls 52, 54 and 55 are made of metal and are interconnected to form a rigid structure. Each side wall 54, 55 is formed with a side ledge 56 for supporting the mounting tray 10 and enabling its sliding insertion into the support structure 50.

Figure 13:
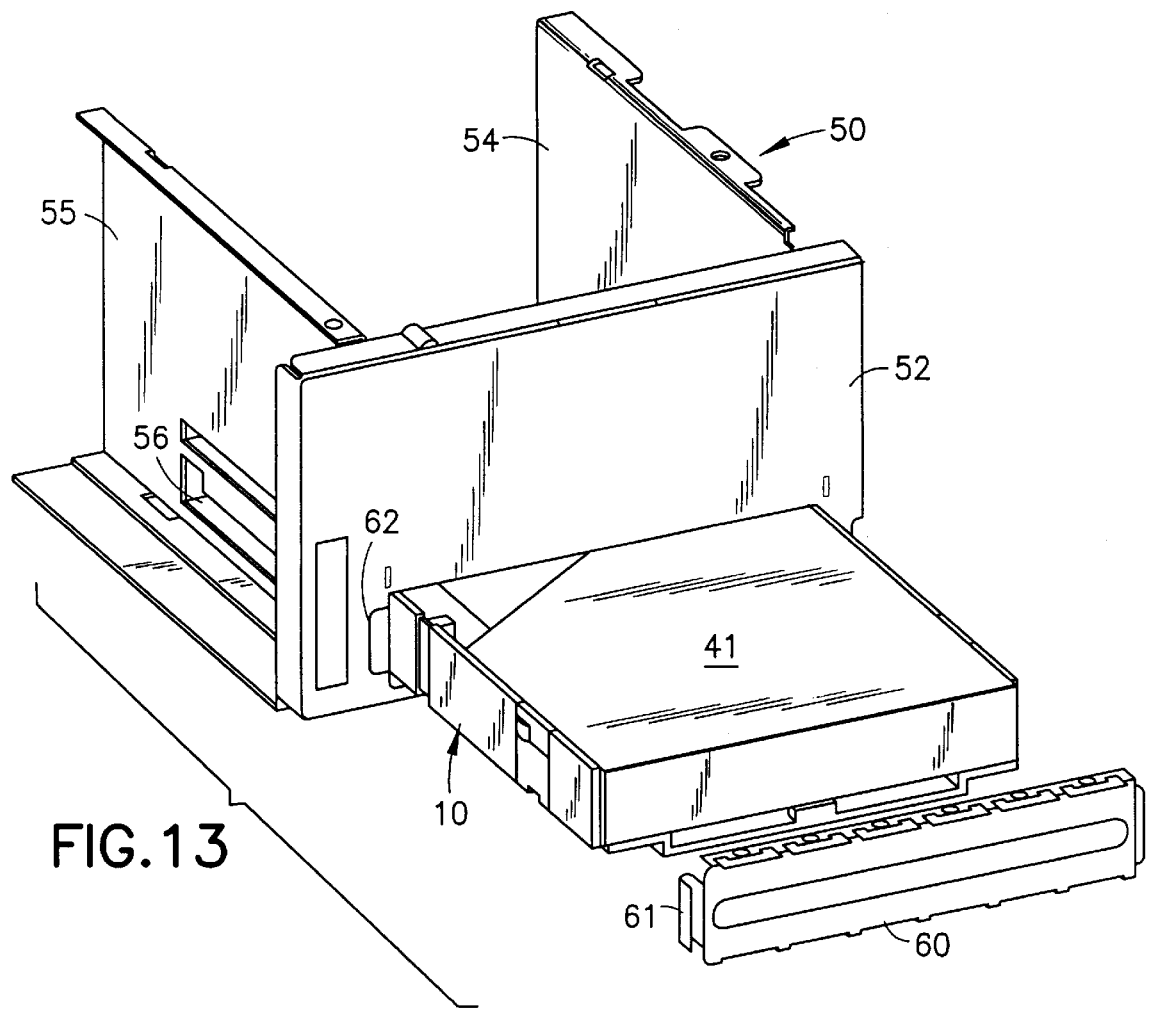
FIG. 13 is a front perspective view of the FIG. 11 support structure showing the insertion of the mounting tray carrying a 5.25 inch disc drive.
Figure 14:
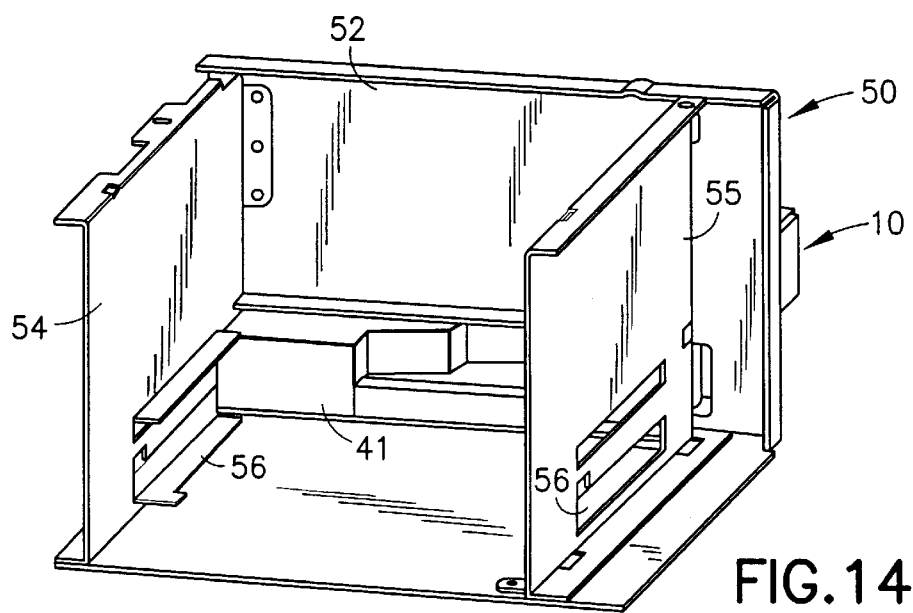
FIG. 14 is a rear perspective view showing the insertion of the mounting tray carrying the 5.25 inch disc drive.

FIGS. 13 and 14 illustrate the insertion of the mounting tray into the support structure 50, the mounting tray being shown as carrying a drive unit 41. The mounting tray 10 is inserted through the aperture 53 from externally of the computer and is seated by its step elements 17 on the ledges 56. The mounting tray is then slid into the support structure guided by the side walls 54 and 55 and the ledges 56. When the mounting tray 10 is fully inserted into the support structure, hook members 28 and 29 provided on the underside of the step elements 17 (see FIG. 2) engage respectively underneath the front edges 58 of the ledges 56 and underneath projecting tabs 57 provided at the rear of the ledges 56. The hook members 28 and 29 serve not only to define the limit of insertion of the mounting tray 10 into the support structure 50, but also to prevent the mounting tray from lifting off the support ledges 36.

With the mounting tray inserted into the support structure, the mounting elements 25 provide for grounding of the drive unit 41 onto the side walls 54 and 55 through the resilient contact arms 40 of the mounting elements.

A closure element 60 (see FIG. 13) is used to close the aperture 53 after insertion of the mounting tray 10. The closure element 60 has a resilient member 61 that snap engages behind an edge 62 of the wall 52.

It will be appreciated that the above described embodiment of the invention provides a simple and convenient way for mounting either a 5"25 drive unit or a 3"5 drive unit, the mounting tray 10 being readily engaged about the selected drive unit without the use of any tool. Furthermore, the joining together of the side members 12 and 13 by the cross member 14 not only makes the handling of the side mounting members easy but provides a unitary mounting tray that it can be stored on the ledges 56 even when no drive unit is mounted (if the mounting members 12, 13 were not connected together, they could not be stored so readily).

Many variants are, of course, possible to the described embodiment. For example, although the use of locating studs is preferred for locating a drive unit in the mounting tray, it would also be possible to use other means including fixing screws. Furthermore, it would be possible to provide the side mounting members 12, 13 as separate pieces—that is, not joined by a cross member 14; however, this is not preferred for the reasons already indicated.

It will be understood that the functionality of the unit mounted in the mounting tray 10 is not relevant to the present invention and any desired subsystem, including for example a printer unit, could be mounted in the tray 10.

We claim:

1. A mounting arrangement for mounting at different times either of two differently-sized subsystem units in a common volume, said mounting arrangement comprasing:

a first subsystem unit;

a second subsystem unit that is larger than said first subsystem unit;

two mounting members for engaging respective opposite sides of a subsystem unit, each mounting member having first engagement means for engaging said second subsystem unit and second engagememt means for engaging said first subsystem unit, at least one said mounting member being formed by a first wall element and a second wall element, separated by a step therebetween, a second said mounting member having at least a third wall element and a fourth wall element, said first engagement means associated with said first wall element and third wall element and said second engagement means associated with said second wall element and fourth wall element, said step causing a spacing of the first engagement means by a distance greater than a spacing between the second engagement means, such that said first and second engagement means are positioned to respectively mount either said second subsystem unit or said first subsystem unit in a substantially common volume encompassed between said first through fourth wall elements, but not to mount both said first subsystem unit and second subsystem unit at a same time in said common volume due to a positioning of at least a portion of each thereof in an interfering position with a mounted position of the other; and a support structure for supporting said mounting members.

2. A mounting arrangement according to claim 1, wherein both said mounting members are formed with a said step.

3. A mounting arrangement according to claim 2, wherein said support structure is provided with support ledges for seating the steps of said mounting members when the latter are engaged about a said subsystem unit, said support ledges enabling the sliding insertion and withdrawal of the mounting members engaged about a said subsystem unit.

4. A mounting arrangement according to claim 3, wherein the mounting members are provided on an underside of their steps with hook means that engage under edges of said support ledges when said mounting members are in a fully inserted position.

5. A mounting arrangement according to claim 1, wherein said mounting members are interconnected by a flexible cross member permitting the mounting members to be flexed out of a normal oppositely-facing configuration for engagement about either said subsystem unit.

6. A mounting arrangement according to claim 1, wherein said engagement means are arranged to engage in fixing holes provided in the sides of each said subsystem unit.

7. A mounting arrangement according to claim 6, wherein said engagement means comprise studs.

8. A mounting arrangement according to claim 7, wherein each said mounting member comprises a wall element and at least one generally U-shaped resilient metal member having two interconnected side arms embracing said wall element, one said arm of the mounting element being stepped and being provided with two projections serving as said studs respectively of said first and second engagement means, and the other said arm being provided with an outwardly-projecting resilient contact providing an electrical grounding connection to said support structure.

9. A mounting arrangement according to claim 8, wherein each said wall element is formed with at least one recess proximate each said mounting element and each mounting element is formed with at least one inwardly-directed projection snap engaged in a corresponding said recess.

10. A mounting arrangement according to claim 7, wherein for said at least one mounting member formed with a step, the studs constituting the second engagement means are located on the mounting member juxtaposed said step.

11. A mounting arrangement according to claim 1, wherein said support structure is provided with guide means for guiding the sliding insertion and withdrawal of the mounting members engaged about a said subsystem unit.

* * * * *